(12) United States Patent
Fitzer et al.

(10) Patent No.: US 10,778,540 B2
(45) Date of Patent: Sep. 15, 2020

(54) SCALABLE INFRASTRUCTURE FOR DEVELOPING, RUNNING, AND DEPLOYING ARBITRARY APPLICATIONS

(71) Applicant: SAP SE, Walldorf (DE)

(72) Inventors: Joachim Fitzer, Schriesheim (DE); Pietro Francisco Menna, Sao Leopoldo (BR); Felipe Musse, Porto Alegre (BR); Simon Seif, Ostringen (DE)

(73) Assignee: SAP SE, Walldorf (DE)

( * ) Notice: Subject to any disclaimer, the term of this patent is extended or adjusted under 35 U.S.C. 154(b) by 51 days.

(21) Appl. No.: 16/214,581

(22) Filed: Dec. 10, 2018

(65) Prior Publication Data

US 2020/0186443 A1    Jun. 11, 2020

(51) Int. Cl.
*H04L 12/24*     (2006.01)
*G06F 8/75*     (2018.01)
*H04L 29/08*     (2006.01)
*G06F 9/455*     (2018.01)

(52) U.S. Cl.
CPC ............ *H04L 41/5048* (2013.01); *G06F 8/75* (2013.01); *G06F 9/45558* (2013.01); *H04L 41/5054* (2013.01); *H04L 41/5058* (2013.01); *H04L 67/10* (2013.01); *H04L 67/32* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 10,594,582 B2 * | 3/2020 | Joshi | H04L 41/5096 |
| 2014/0130036 A1 * | 5/2014 | Gurikar | G06F 8/61 717/176 |
| 2015/0051930 A1 * | 2/2015 | Yamaguchi | G06Q 10/0631 705/7.12 |
| 2016/0112497 A1 * | 4/2016 | Koushik | H04L 67/10 726/7 |
| 2017/0111241 A1 * | 4/2017 | Degioanni | H04L 41/5058 |
| 2018/0152534 A1 * | 5/2018 | Kristiansson | G06F 8/60 |
| 2019/0065323 A1 * | 2/2019 | Dhamdhere | G06F 11/3452 |
| 2020/0076685 A1 * | 3/2020 | Vaidya | H04L 61/3015 |

OTHER PUBLICATIONS

Wikipedia, "Kubernetes" Dec. 9, 2018; accessed <https://en.wikipedia.org/w/index.php?title=Kubernetes&oldid=872771944> (Year: 2018).*

* cited by examiner

*Primary Examiner* — Thomas J Dailey
(74) *Attorney, Agent, or Firm* — Schwegman Lundberg & Woessner, P.A.

(57) ABSTRACT

Example methods and systems are directed to providing an abstraction layer to deployed applications, so that the applications can concentrate on building their domain-specific functionality and not have to worry about scalability. In an example embodiment, Kubernetes is used as a form of distributed operating system that the system controls on one side and that is deployed on the other side. It works as an abstraction for the end-users to be able to scale applications and persistent data for various tenants, route requests to correct applications, maintain metadata, and monitor the cluster.

20 Claims, 11 Drawing Sheets

SCALABLE INFRASTRUCTURE FOR DEVELOPING, RUNNING, AND DEPLOYING ARBITRARY APPLICATIONS

TECHNICAL FIELD

The subject matter disclosed herein generally relates to cloud and on-premises applications. Specifically, the present disclosure addresses systems and methods to provide a scalable infrastructure for developing, running, and deploying arbitrary applications in the cloud and on-premises.

BACKGROUND

Kubernetes® is a system for automating deployment, scaling, and management of containerized applications. Application containerization is a virtualization method used by operating systems to deploy and run distributed applications without launching an entire virtual machine for each application.

Containerized applications have advantages over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

One solution to this problem is to run each application in a virtual machine that only has the operating system and the application installed. This ensures that different applications will not cause problems for each other. However, virtual machines have substantial overhead associated with them. As a result, to achieve the same performance as with a standard, non-virtual, deployment, additional or higher-performing computing hardware will be required, increasing costs.

Kubernetes® provides another solution in the form of containerized applications. Each container comprises an application and its libraries, but the containers are installed and managed with much less overhead than virtual machines.

Traditionally, software is written to be deployed on special target platforms and environments (e.g., a Linux operating system with particular machines installed on-premise). Modernly, however, this type of software deployment has changed. Specifically, cloud deployments of applications have become more popular, where an application is installed on cloud servers and users access the cloud services to access and run the applications as services. This creates a challenge when it comes to scalability. When an application is launched, however, there may only be ten users operating it, but within a short amount of time that number can increase to thousands of users. Additionally, there may be some periods where a large number of users access the application while at other times a smaller number of users access the application, creating wild swings in usage, even within a single day.

Furthermore, often the software itself is so complex that it is developed by several companies using hundreds of developers. This can make it challenging to provide patches of the applications, as well as customizations, extensions, and other modifications.

Providing all of these features in a highly specific application would not scale.

BRIEF DESCRIPTION OF THE DRAWINGS

Some embodiments are illustrated by way of example and not limitation in the figures of the accompanying drawings.

DETAILED DESCRIPTION

Example methods and systems are directed to providing an abstraction layer to deployed applications, so that the applications can concentrate on building their domain-specific functionality and not have to worry about scalability. In an example embodiment, Kubernetes® is used as a form of distributed operating system that the system controls on one side and that is deployed on the other side. It works as an abstraction for the end-users to be able to scale applications and persistent data for various tenants, route requests to correct applications, maintain metadata, and monitor the cluster.

Figure 1:
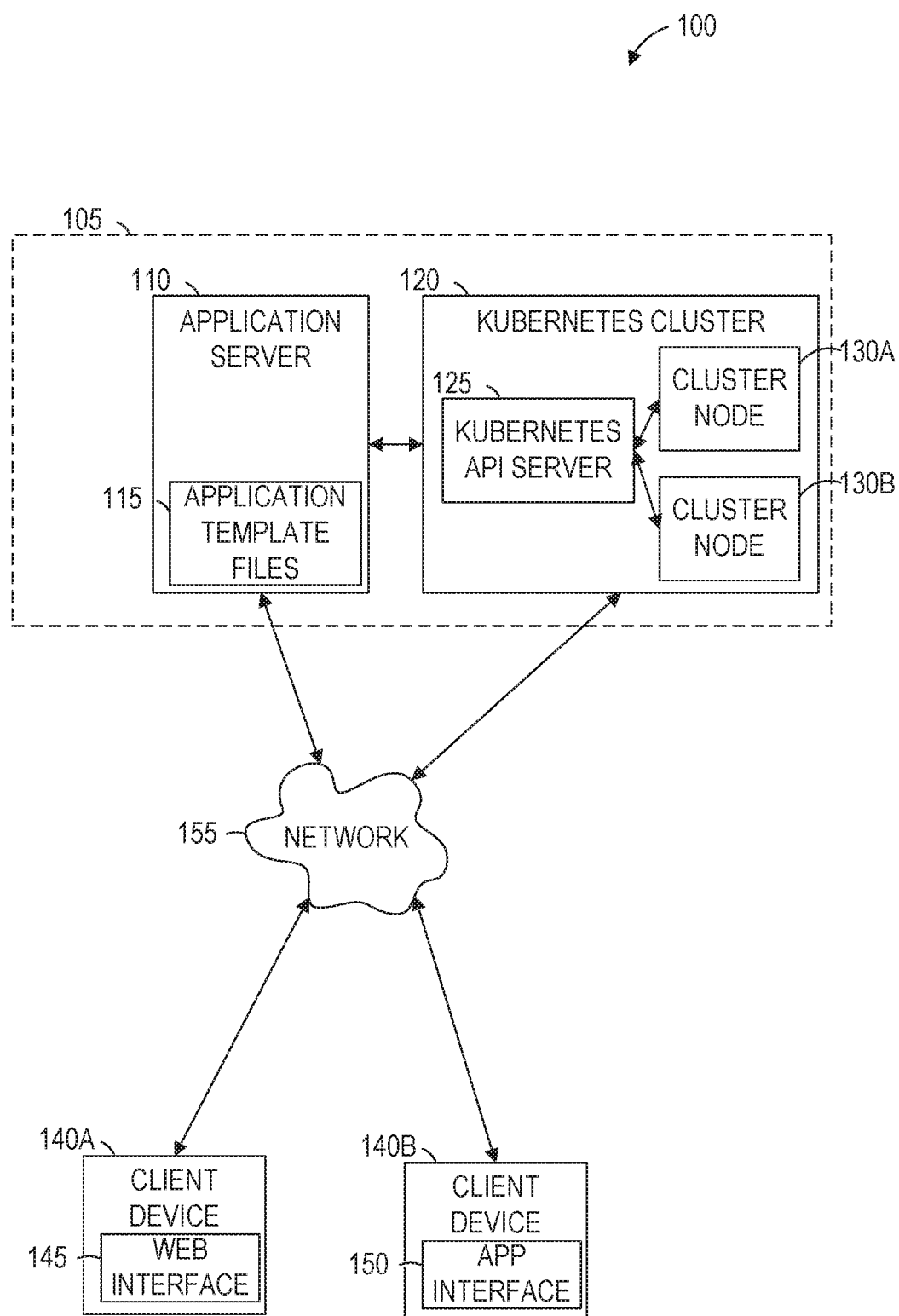
FIG. 1 is a network diagram illustrating a network environment suitable for using Kubernetes® as a distributed operating system for a multitenancy/multiuser environment, according to some example embodiments.

FIG. 1 is a network diagram illustrating a network environment 100 suitable for using Kubernetes® as a distributed operating system for a scalable application system, according to some example embodiments. The network environment 100 includes a network-based application 105, client devices 140A and 140B, and a network 155. The network-based application 105 is provided by an application server 110 in communication with a Kubernetes® cluster 120. The application server 110 accesses application template files 115 to configure and deploy an application to the Kubernetes® cluster 120 via the Kubernetes® API server 125 interacting with a set of cluster nodes 130A, 130B. The containerized application is provided to the client devices 140A and 140B via a web interface 145 or an application interface 150. The application server 110, the Kubernetes® API server 125, the cluster nodes 130A and 130B, and the client devices 140A and 140B may each be implemented in a computer system, in whole or in part, as described below with respect to FIG. 9. The cluster nodes 130A and 130B may be referred to collectively as the cluster nodes 130 or generically as a cluster node 130. The client devices 140A and 140B may be referred to collectively as client devices 140 or generically as a client device 140.

The application server 110 provides a user interface for selecting an application to the client devices 140. The Kubernetes® API server 125 provides an interface to the Kubernetes® cluster 120 and deploys applications to the cluster nodes 130. The selected application may be invoked via a virtual system application. The client device 140 may provide identifying information to the application server 110, and the identifying information may be used by the Kubernetes® API server 125 or the virtual system application to determine a particular instance of the selected application to invoke.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110, the Kubernetes® API server 125, the cluster nodes 130A-130B, and the client devices 140A-140B may be connected by the network 155. The network 155 may be any network that enables communication between or among machines, databases, and devices. Accordingly, the network 155 may be a wired network, a wireless network (e.g., a mobile or cellular network), or any suitable combination thereof. The network 155 may include one or more portions that constitute a private network, a public network (e.g., the Internet), or any suitable combination thereof.

Figure 2:
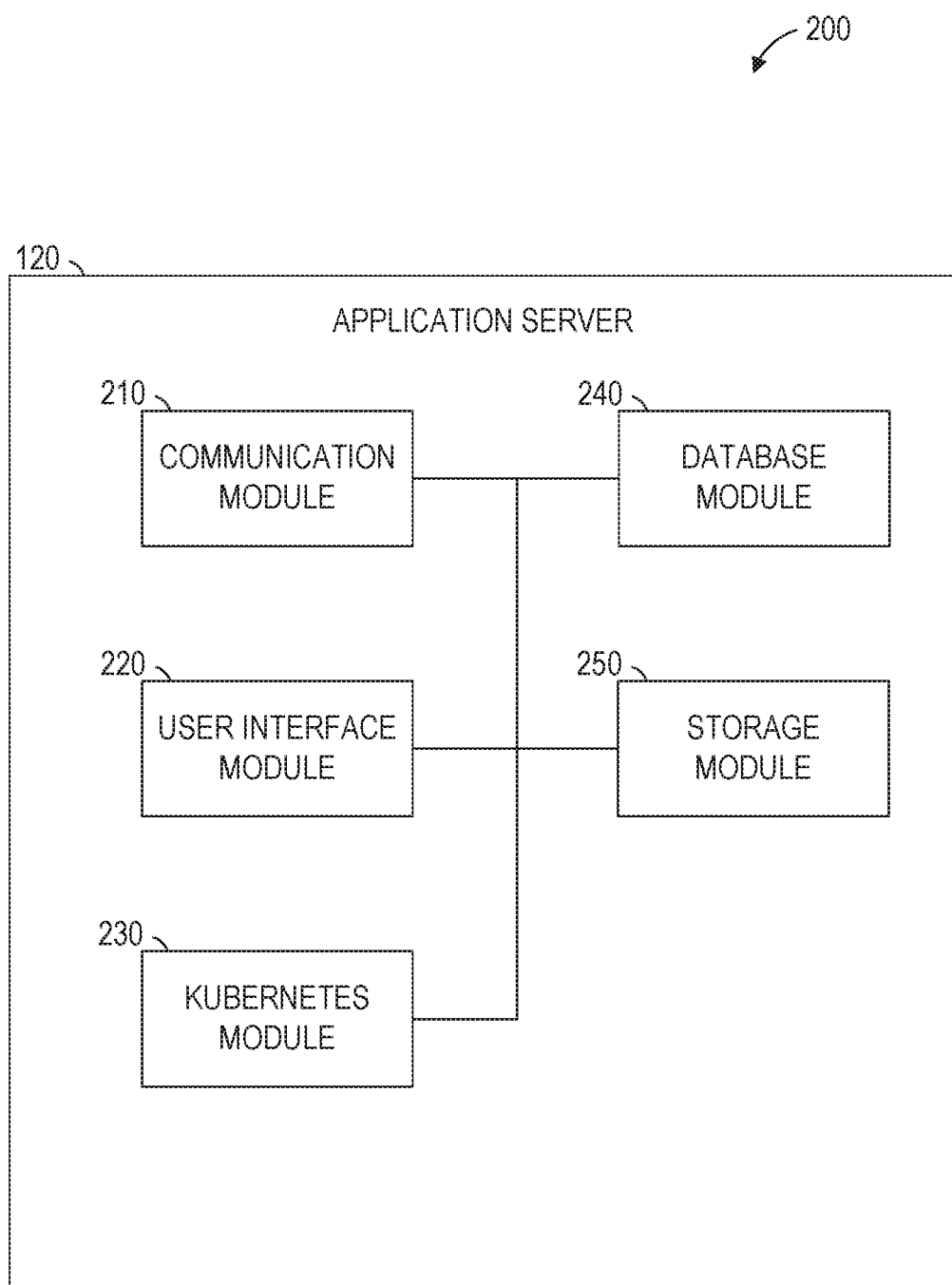
FIG. 2 is a block diagram of an application server, according to some example embodiments, suitable for using Kubernetes® as a distributed operating system for a multitenancy/multiuser environment.

FIG. 2 is a block diagram 200 illustrating components of the Kubernetes® cluster 120, according to some example embodiments. The Kubernetes® cluster 120 is shown as including a communication module 210, a user interface module 220, a Kubernetes® module 230, a database module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the Kubernetes® cluster 120 and transmits data from the Kubernetes® cluster 120. For example, the communication module 210 may receive, from the client device 140A, data for a selected application. The communication module 210 provides the data to the Kubernetes® module 230. The Kubernetes® module 230 communicates with the Kubernetes® API server 125 to cause one or more of the cluster nodes 130, via a virtual system application, to execute the application. The cluster nodes 130 executing the application communicate with the client device 140A via the network 155 to provide the selected application. In some example embodiments, data from the file is stored in a database via the database module 240 and the storage module 250. After being stored, the data may be accessed from the database. The communication module 210 may transmit a user interface from the user interface module 220 to the client device 140A that includes data for available applications. The list of available applications may be generated by accessing a manifest file that identifies the available applications, by accessing a directory that contains the files, in the standardized format, for the available applications, by accessing a table in a database that contains entries for the available applications, or any suitable combination thereof. Communications sent and received by the communication module 210 may be intermediated by the network 155.

The user interface module 220 causes presentation of a user interface for the Kubernetes® cluster 120 on a display associated with the client device 140A or 140B. The user interface allows a user to select an application from a list of applications, to interact with an application, or any suitable combination thereof.

Figure 3:
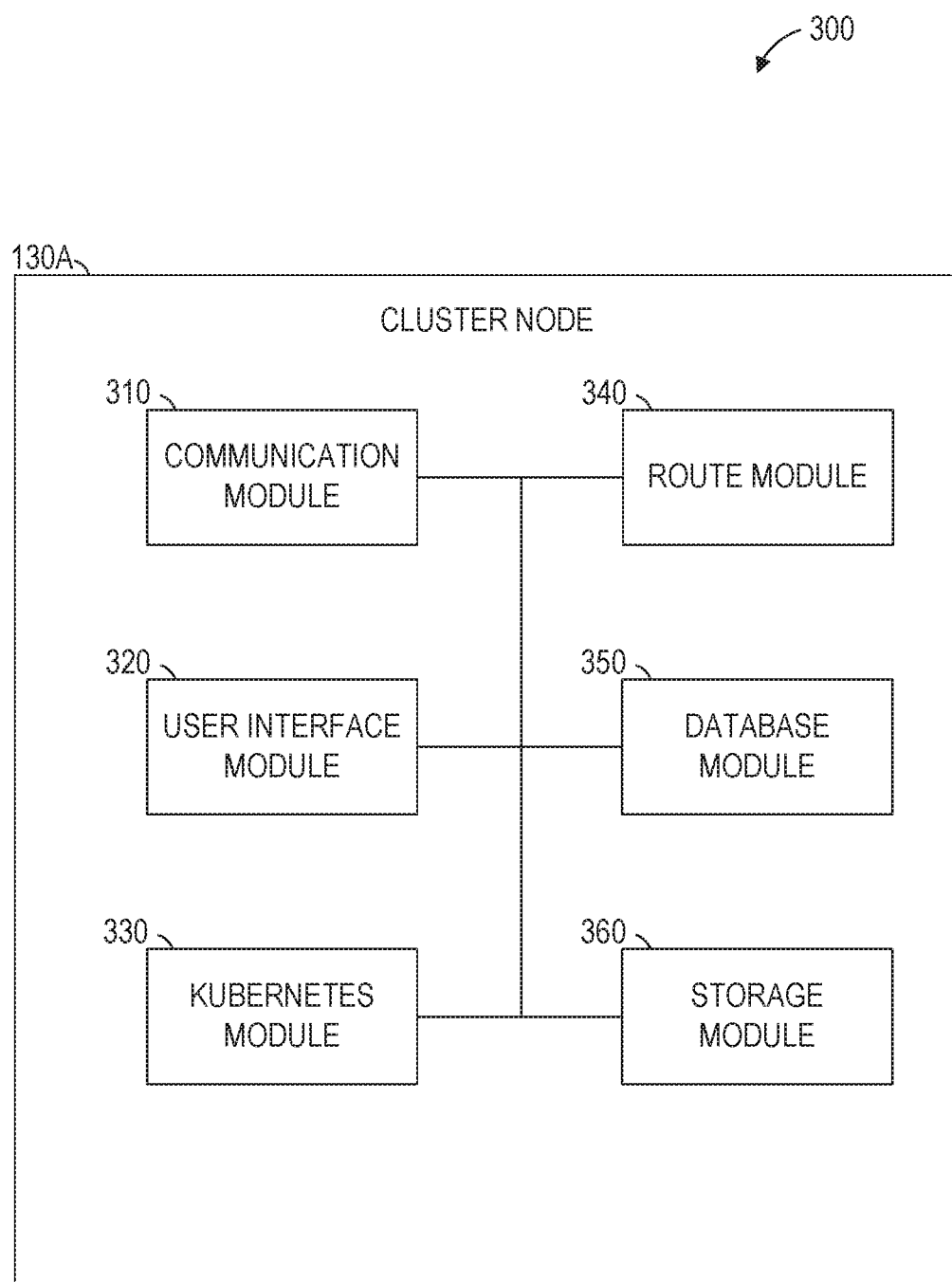
FIG. 3 is a block diagram of a cluster node, according to some example embodiments, suitable for using Kubernetes® as a distributed operating system for a multitenancy/multiuser environment.

FIG. 3 is a block diagram 300 illustrating components of the cluster node 130A, according to some example embodiments. The cluster node 130A is shown as including a communication module 310, a user interface module 320, a Kubernetes® module 330, a route module 340, a database module 350, and a storage module 360, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 receives data sent to the cluster node 130A and transmits data from the cluster node 130A. For example, the communication module 310 may receive, from the Kubernetes® API server 125, a request to use an application via a virtual system. The request may identify a user, a client device, a tenant, or any suitable combination thereof. The communication module 310 provides the data to the Kubernetes® module 330. The route module 340, invoked by the Kubernetes® module 330, determines which instance of the application to connect the client device to. The cluster node 130A, executing the instance of the application, communicates with the client device 140A via the network 155 to provide the application. In some example embodiments, data for the tenant is stored in a database via the database module 350 and the storage module 360. After being stored, the data may be accessed from the database. The communication module 310 may transmit a user interface from the user interface module 320 to the client device 140A that includes data for the application instance. Communications sent and received by the communication module 310 may be intermediated by the network 155.

The user interface module 320 causes presentation of a user interface for the cluster node 130A on a display associated with the client device 140A or 140B. The user interface allows a user to interact with the application instance.

Figure 4:
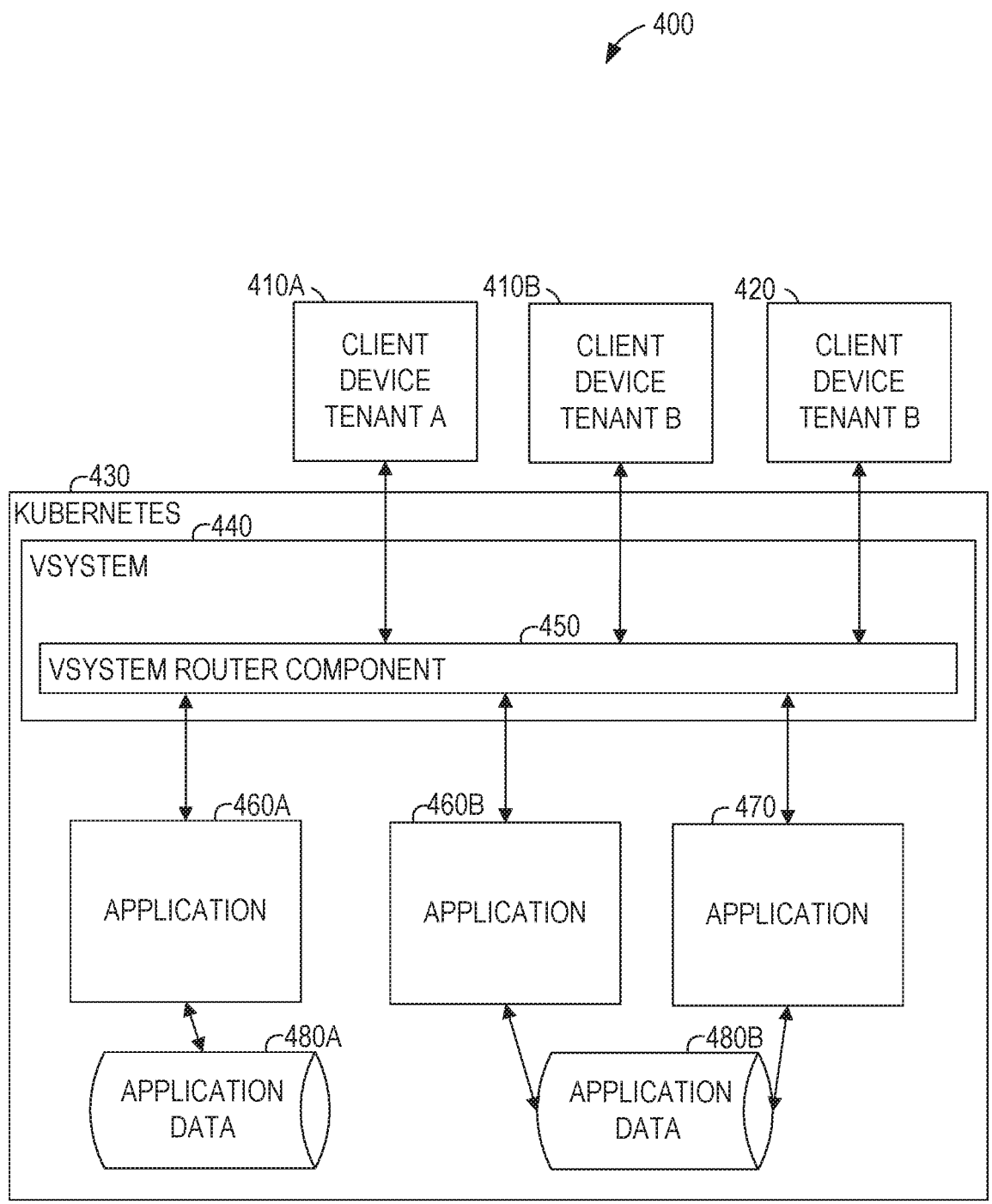
FIG. 4 is a block diagram of client devices in communication with a Kubernetes® cluster acting as a distributed operating system that provides a multitenancy/multiuser environment, according to some example embodiments.

FIG. 4 is a block diagram 400 of client devices 410A, 410B, and 420 in communication with a Kubernetes® cluster 430 acting as a distributed operating system that provides a multitenancy/multiuser environment, according to some example embodiments. The Kubernetes® cluster 430 provides a Kubernetes® virtual system ("vsystem") 440 application, application instances 460A, 460B, and 470, and data 480A and 480B. The data 480A may be stored in a first data store and the data 480B may be stored in a separate, second data store. A data store is a repository for persistently storing and managing data. Thus, separate data stores may be realized by using separate hardware devices or by using separate databases or other files to store the separate data stores.

Instead of directly requesting an application instance 460A, 460B, or 470 from the Kubernetes® API server 125, the client devices invoke the vsystem 440. Based on information provided by the client device and the identity of the client device (e.g., unique identifying information for the client device stored in a cookie provided by the Kubernetes® API server 125), a vsystem router component 450 routes the client to an appropriate application instance. In this example, the application instances are instances of Kubernetes® containerized applications.

In some example embodiments, the request by each client device includes a uniform resource locator (URL) that identifies the application being requested. Thus, the request by the client device 410A and the request by the client device 410B may both use the same URL for the requested application but be routed to different instances of the application.

Though the example embodiment of FIG. 4 is described using the vsystem Kubernetes® containerized application as a control application that controls the routing of the client devices to application instances, other types of control applications are possible. For example, the control application could execute outside of the Kubernetes® environment and select the particular application instance to run within Kubernetes® based on the identifier of the client device.

Figure 5:
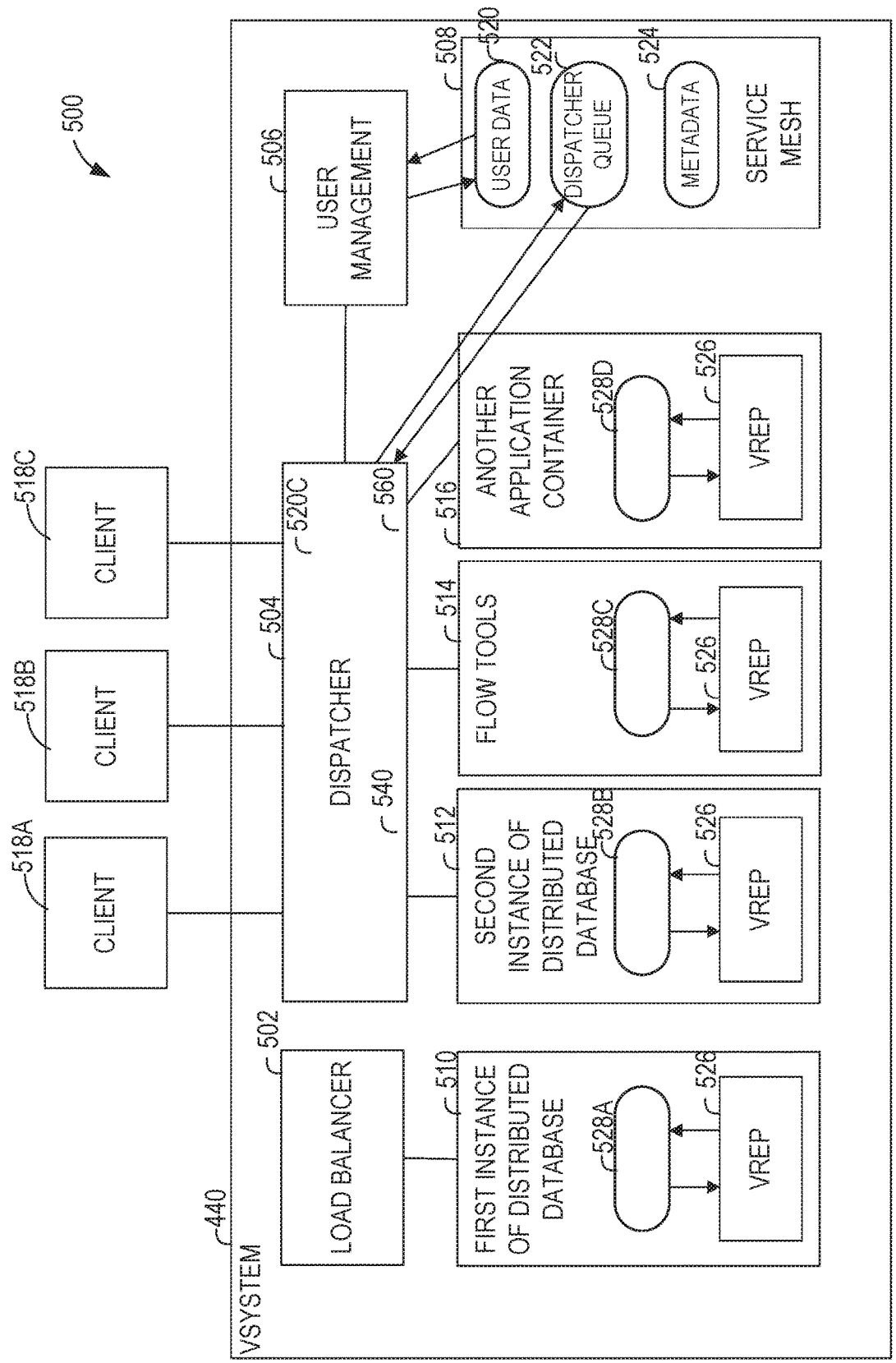
FIG. 5 is a block diagram of a virtual system (vsystem), according to some example embodiments.

FIG. 5 is a block diagram 500 of a vsystem 440, according to some example embodiments. From the perspective of the Kubernetes® cluster, the vsystem 440 is an ordinary Kubernetes®-application, and specifically a virtual system. The vsystem 440 may include a load balancer 502, dispatcher 504, user management component 506, a service mesh 508, a first instance of a distributed database 510, a second instance of a distributed database 512, flow tools 514, and another application container 516. The first instance of a distributed database 510, second instance of a distributed database 512, flow tools 514, and another application container 516 are all possible applications that may or may not be accessible to a client. Application container 516 is intended to depict any other type of application that the vsystem 440 can be extended to accommodate. Access to one of these applications running in vsystem 440, such as from clients 518A-518C, is controlled by the dispatcher 504. The clients 518A-518C make requests to the vsystem 440, which are then passed through the dispatcher 504, which then decides which components or instances should handle each request. The user management component 506 aids the dispatcher 504 in making this determination. The service mesh 508 acts to store user data 520 such as access passwords, maintain a dispatcher queue 522 containing operations ordered by the dispatcher 504, and maintain metadata 524 for a virtual repository (vRep) 526, which is a distributed file system divided by user. The vRep 526 may be maintained within each of the applications 510-516, and each instance of the vRep may contain its own, different top layer 528A-528D, which is unique for each user. This allows application data to be isolated based on users. The users can access files directly in their corresponding top layers 528A-528D, and each of these top layers can also be used by vsystem 440 itself to determine which applications to access for which users and other configuration files. The vsystem 440 starts and stops the applications as needed. An application can run isolated for each user and/or can comprise different pods. Thus it is appropriate for stateful applications as well as for stateless applications (microservices). Applications are scaled by the vsystem 440, and the application versions used are also controlled (via vRep 526) by the vsystem 440.

After a client 518A-518C is connected to a particular vsystem application instance, communications between the client device and the destination application instance may be intermediated by the vsystem application instance. Alternatively, the client device may be redirected to the destination application instance by the vsystem, so that further communications between the application instance and the client device are direct.

Figure 6:
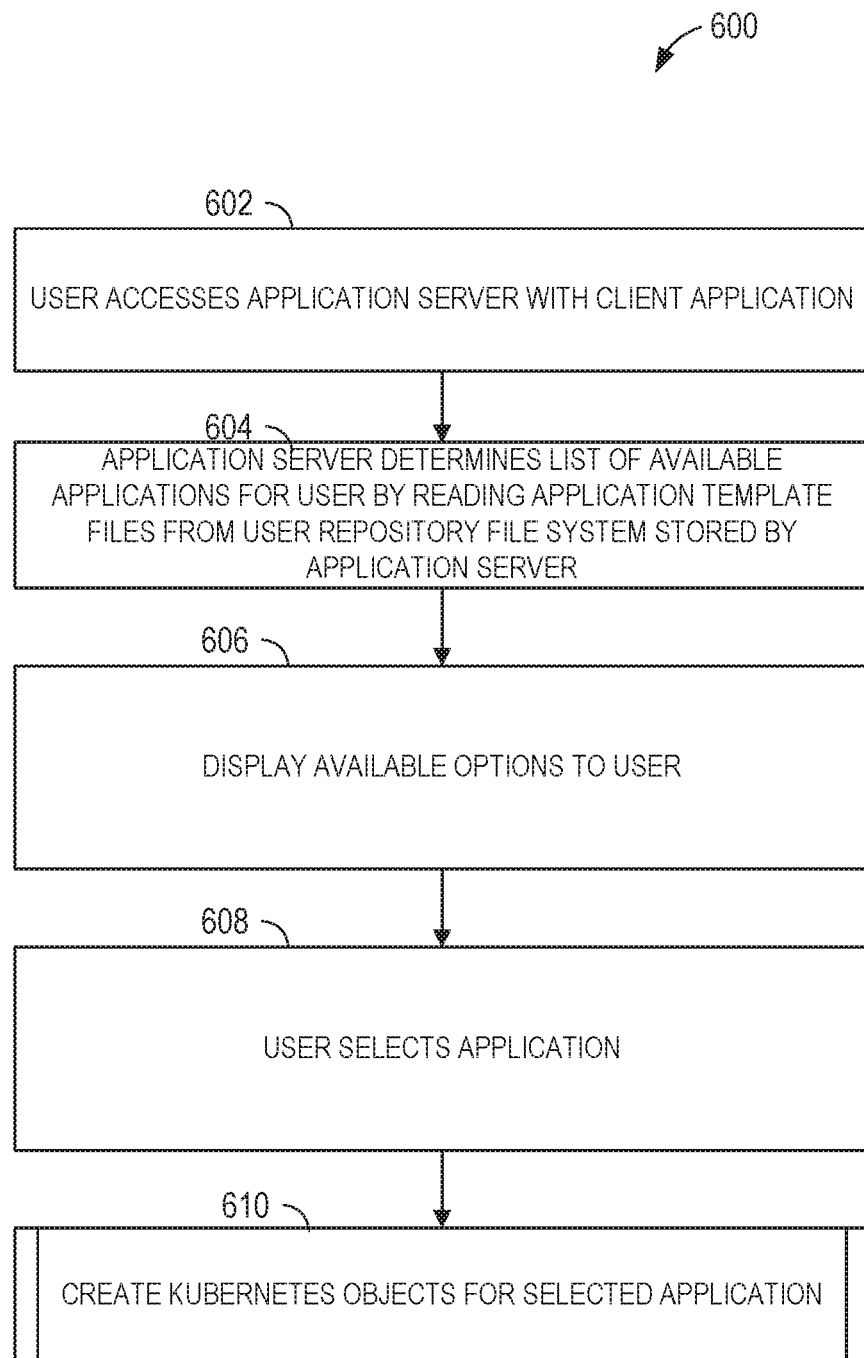
FIG. 6 is a flowchart illustrating operations of a method suitable for using a vsystem to start an application via an abstraction layer, in accordance with an example embodiment.

FIG. 6 is a flowchart illustrating operations of a method 600 suitable for using a vsystem, such as vsystem 440, to start an application via an abstraction layer, in accordance with an example embodiment. At operation 602, a user accesses an application server with a client application. In an example embodiment, the client application may be a web browser. At operation 604, the application server determines a list of available applications for the user by reading application template files from a user repository file system stored by the application server. At operation 606 the available options for applications are displayed to the user via the client application.

At operation 608, the user selects an application from the available options, via interaction with the client application, such as by selecting an application via a graphical user interface. At operation 610, the application server creates the required Kubernetes® objects for the selected application. Multiple application types are supported. Each application type comprises different Kubernetes® objects working together. The application server is extensible and allows the inclusion of new application types. The application server may be, for example, application server 110 of FIG. 1.

Figure 7:
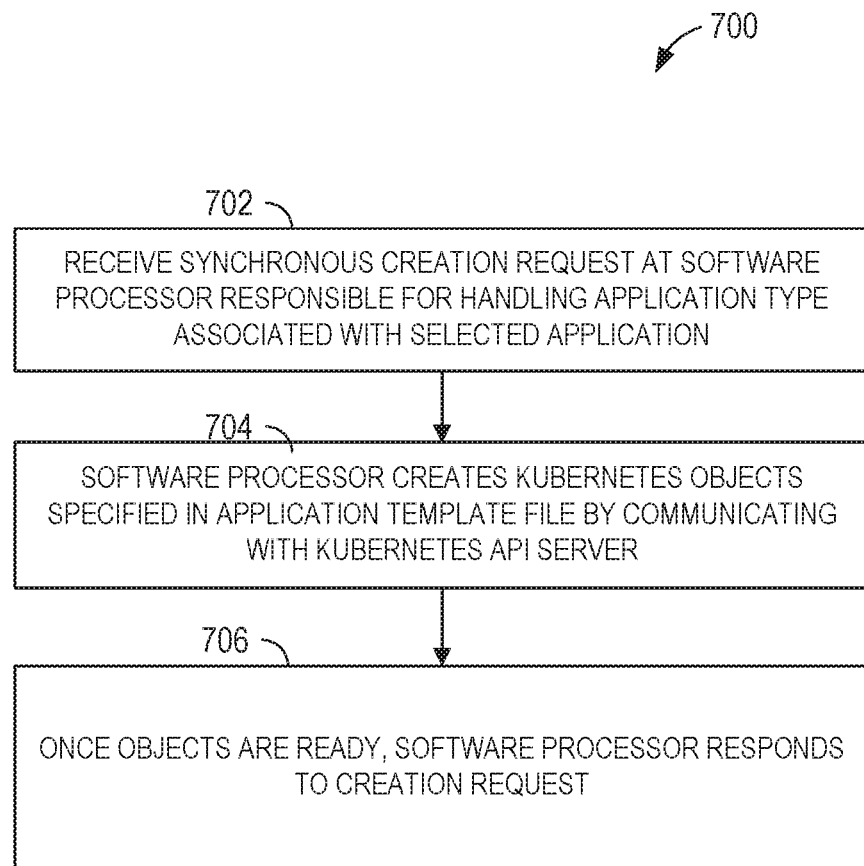
FIG. 7 is a flowchart illustrating operations of a method suitable for creating required Kubernetes® objects, in accordance with an example embodiment.

FIG. 7 is a flowchart illustrating operations of a method 700 suitable for creating required Kubernetes® objects, in accordance with an example embodiment. Specifically this method 700 may be performed at operation 610 of FIG. 6. At operation 702, a synchronous creation request is received at a software processor responsible for handling an application type associated with a selected application, from the application server. At operation 704, the software processor creates the Kubernetes® objects specified in the application template file by communicating with the Kubernetes® API server. At operation 706, once the objects are ready, the software processor responds to the creation request. This response may include the hostname and port at which the application is available. Thus, once the Kubernetes® objects are ready, the client application of the user is redirected to the application. In some example embodiments, the hostname corresponds to a Kubernetes® service.

Figure 8:
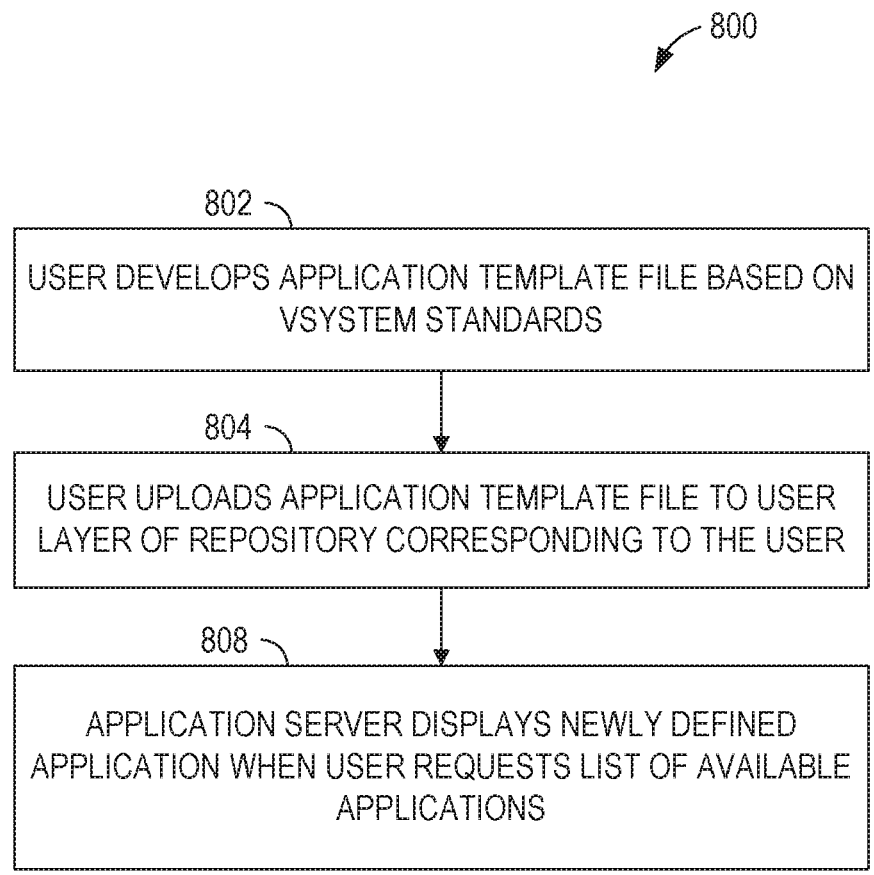
FIG. 8 is a flowchart illustrating operations of a method suitable for defining a new application using a vsystem, in accordance with an example embodiment.

FIG. 8 is a flowchart illustrating operations of a method 800 suitable for defining a new application using vsystem, in accordance with an example embodiment. At operation 802, a user develops an application template file based on vsystem standards. At operation 804, the user uploads the application template file to a user layer of a repository corresponding to the user on the application server, through a command line tool or through the application server user interface on a browser. At operation 806, the application server displays the newly defined application when the user requests a list of available applications. The new application is only available to the user that defined it, unless and until the user makes the new application available to other users.

Figure 9:
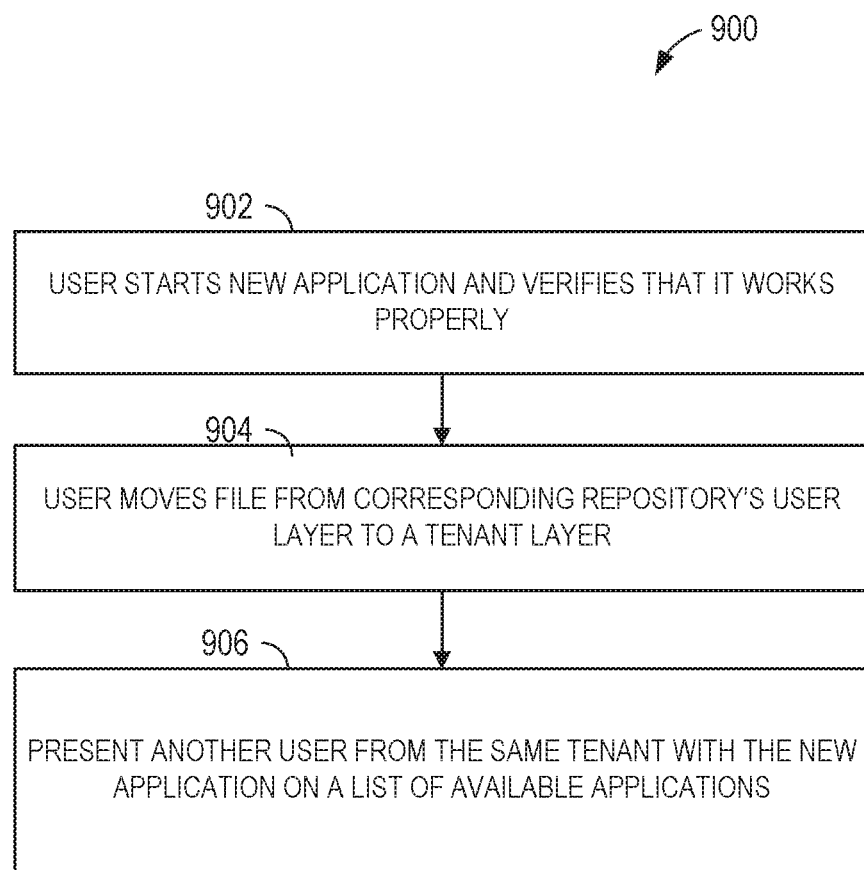
FIG. 9 is a flowchart illustrating operations of a method suitable for making a new application available to other users, in accordance with an example embodiment.

FIG. 9 is a flowchart illustrating operations of a method 900 suitable for making a new application available to other users, in accordance with an example embodiment. The method 900 may be deployed on any of the hardware described herein. As shown at operation 902, the user starts the new application and verifies that it operates within parameters defined by the user. Thereafter, at operation 904, the user moves the file from his or her corresponding repository's user layer to a tenant layer in vsystem. At operation 906, another user from the same tenant can now be presented with the new application on a list of available applications.

EXAMPLES

Example 1

A system comprising:
at least one hardware processor; and
a computer-readable medium storing instructions that, when executed by the at least one hardware processor, cause the at least one hardware processor to perform operations comprising:
receiving, via a computer network, a request from a client application to view applications available to run by a user of the client application;
retrieving via the computer network, one or more application template files stored in a repository file system corresponding to the user;
based on the retrieved one or more application template files, identifying a list of available applications to run by the user;
receiving, from the client application, a selection of one of the available applications to run by the user;
identifying an application type for the selected application by parsing the application template file corresponding to the selected application;
creating a synchronous creation request to a software processor responsible for handling the identified application type, causing the software processor to create one or more objects specified in the application template file corresponding to the selected application; and
once the created one or more objects are ready, sending application instance information, via the network, to the client application.

Example 2

The system of Example 1, wherein the application instance information includes a hostname and port at which the selected application is available.

Example 3

The system of Examples 1 or 2, wherein the one or more objects specified in the application template file corresponding to the selected application are one or more Kubernetes® objects.

Example 4

The system of any of Examples 1-3, wherein the one or more objects specified in the application template file corresponding to the selected application are created by communicating with a Kubernetes® API server.

Example 5

The system of Example 2, wherein the hostname corresponds to a Kubernetes® service.

Example 6

The system of any of Examples 1-5, wherein the selected application is a Kubernetes® containerized application.

Example 7

The system of any of Examples 1-6, wherein each of the available applications to run by the user is a containerized application containing a copy of a virtual repository for the user and data that is specific to both the corresponding application and the user.

Example 8

A method comprising:
receiving, via a computer network, a request from a client application to view applications available to run by a user of the client application;
retrieving via the computer network, one or more application template files stored in a repository file system corresponding to the user;
based on the retrieved one or more application template files, identifying a list of available applications to run by the user;
receiving, from the client application, a selection of one of the available applications to run by the user;
identifying an application type for the selected application by parsing the application template file corresponding to the selected application;
creating a synchronous creation request to a software processor responsible for handling the identified application type, causing the software processor to create one or more objects specified in the application template file corresponding to the selected application; and once the created one or more objects are ready, sending application instance information, via the network, to the client application.

Example 9

The method of Example 8, wherein the application instance information includes a hostname and port at which the selected application is available.

Example 10

The method of Examples 8 or 9, wherein the one or more objects specified in the application template file corresponding to the selected application are one or more Kubernetes® objects.

Example 11

The method of any of Examples 8-10, wherein the one or more objects specified in the application template file corresponding to the selected application are created by communicating with a Kubernetes® API server.

Example 12

The method of Example 9, wherein the hostname corresponds to a Kubernetes® service.

Example 13

The method of any of Examples 8-12, wherein the selected application is a Kubernetes® containerized application.

Example 14

The method of any of Examples 8-13, wherein each of the available applications to run by the user is a containerized application containing a copy of a virtual repository for the user and data that is specific to both the corresponding application and the user.

Example 15

A non-transitory computer-readable medium that stores instructions that, when executed by one or more processors, cause the one or more processors to perform operations comprising:
receiving, via a computer network, a request from a client application to view applications available to run by a user of the client application;
retrieving via the computer network, one or more application template files stored in a repository file system corresponding to the user;
based on the retrieved one or more application template files, identifying a list of available applications to run by the user;
receiving, from the client application, a selection of one of the available applications to run by the user;
identifying an application type for the selected application by parsing the application template file corresponding to the selected application;
creating a synchronous creation request to a software processor responsible for handling the identified application type, causing the software processor to create one or more objects specified in the application template file corresponding to the selected application; and
once the created one or more objects are ready, sending application instance information, via the network, to the client application.

Example 16

The computer-readable medium of Example 15, wherein the application instance information includes a hostname and port at which the selected application is available.

Example 17

The computer-readable medium of Examples 15 or 16, wherein the one or more objects specified in the application template file corresponding to the selected application are one or more Kubernetes® objects.

Example 18

The computer-readable medium of any of Examples 15-17, wherein the one or more objects specified in the application template file corresponding to the selected application are created by communicating with a Kubernetes® API server.

Example 19

The computer-readable medium of Example 16, wherein the hostname corresponds to a Kubernetes® service.

Example 20

The computer-readable medium of any of Examples 15-19, wherein the selected application is a Kubernetes® containerized application.

Figure 10:
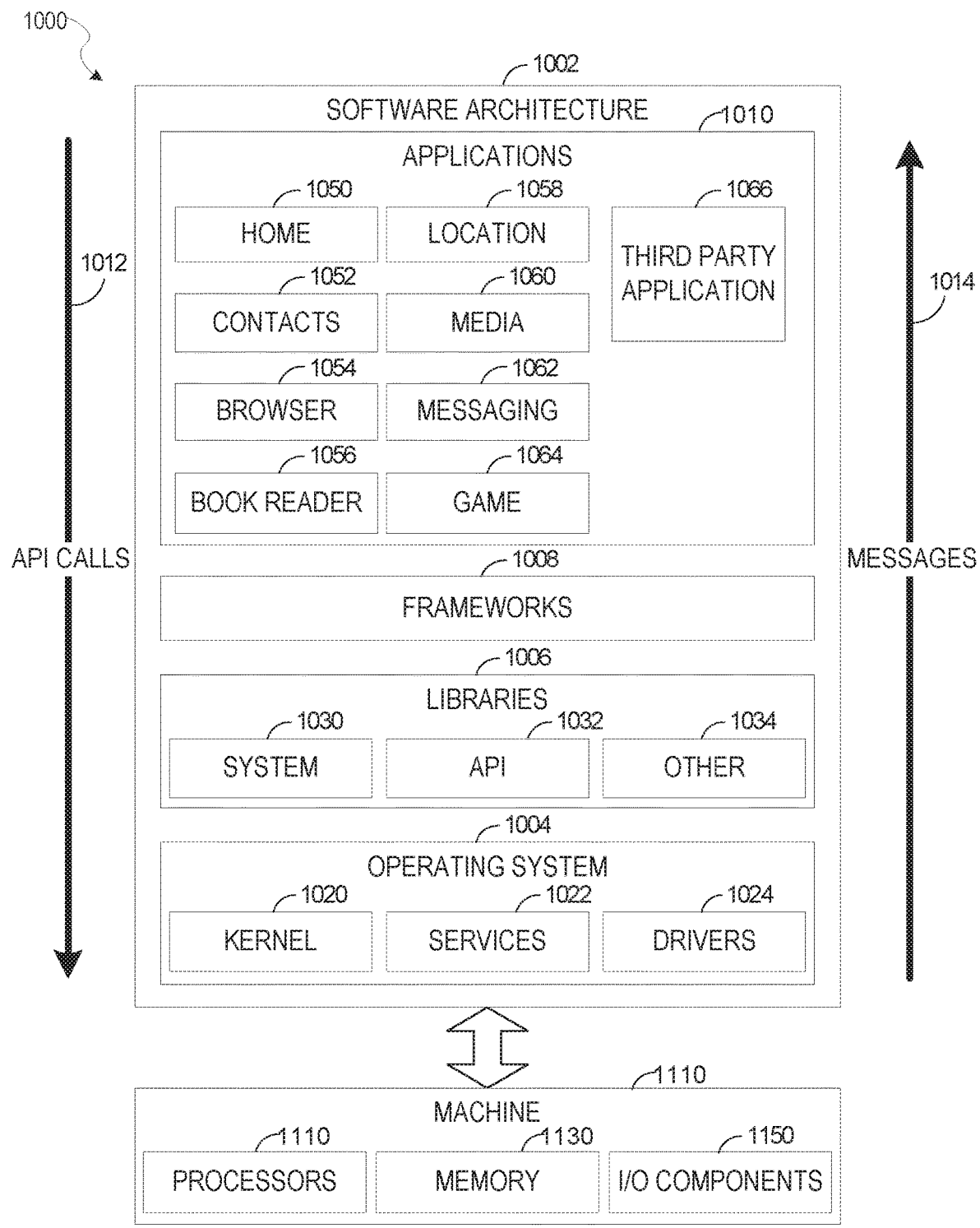
FIG. 10 is a block diagram illustrating an architecture of software, which can be installed on any one or more of the devices described above.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and input/output (I/O) components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
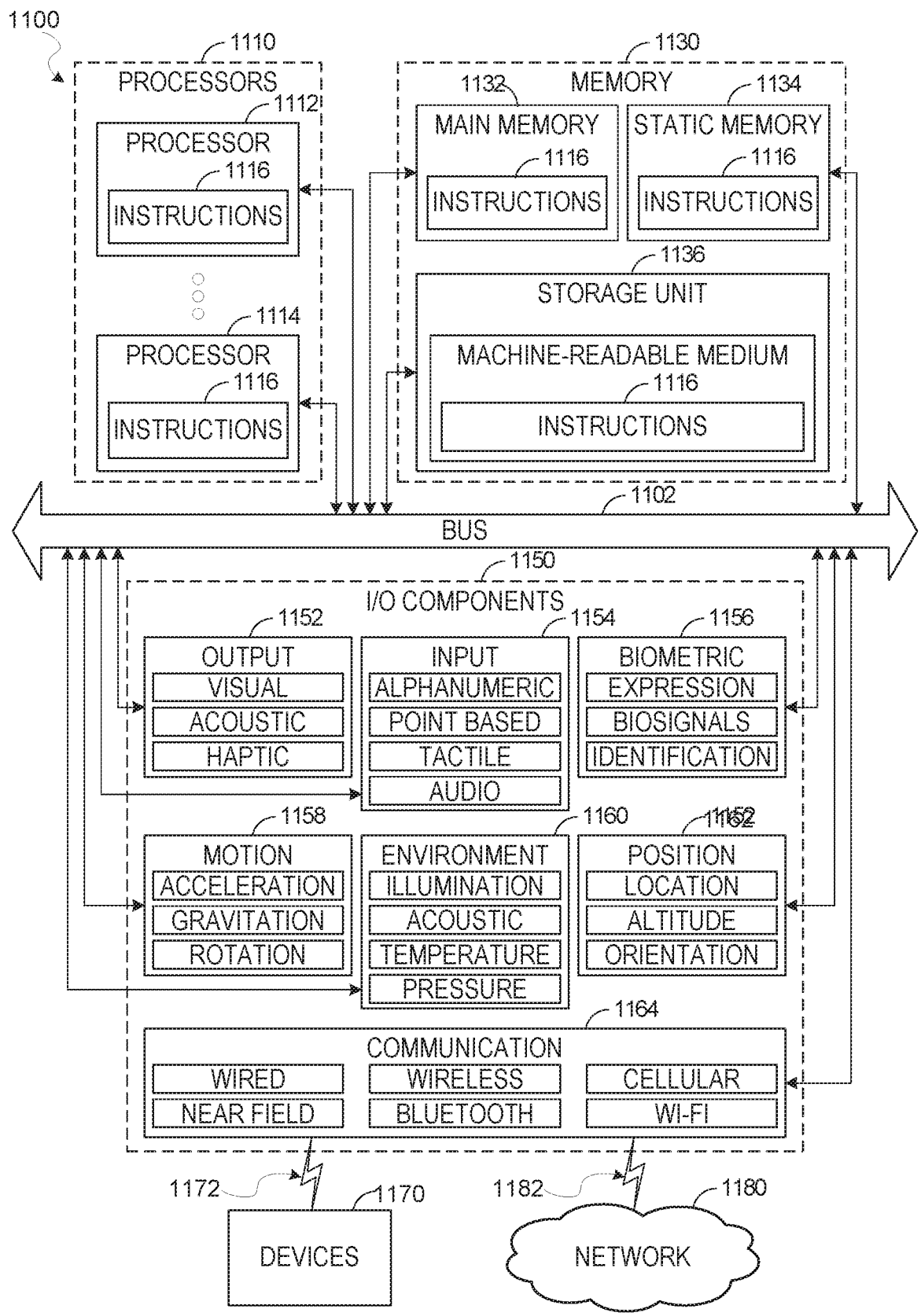
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the methods 6000, 700, 800, 900 of of FIG. 6-9. Additionally, or alternatively, the instructions 1116 may implement FIGS. 1-9 and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RTIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1112, 1114 with a single core, multiple processors 1112, 1114 with multiple cores, or any combination thereof.

The memory 1130 may include a main memory 1132, a static memory 1134, and a storage unit 1136, each accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., coupled via a USB).

Moreover, the communication components 1164 may detect identifiers or include components operable to detect identifiers. For example, the communication components 1164 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., Hypertext Transfer Protocol (IMP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a computer-readable medium storing instructions that, when executed by the at least one hardware processor, cause the at least one hardware processor to perform operations comprising:
    receiving, via a computer network, a request from a client application to view applications available to run by a user of the client application;
    retrieving via the computer network, one or more application template files stored in a repository file system corresponding to the user;
    based on the retrieved one or more application template files, identifying a list of available applications to run by the user;
    receiving, from the client application, a selection of one of the available applications to run by the user;
    identifying an application type for the selected application by parsing the application template file corresponding to the selected application;
    creating a synchronous creation request to a software processor responsible for handling the identified application type, causing the software processor to create one or more objects specified in the application template file corresponding to the selected application; and
    once the created one or more objects are ready, sending application instance information, via the network, to the client application.

2. The system of claim 1, wherein the application instance information includes a hostname and port at which the selected application is available.

3. The system of claim 1, wherein the one or more objects specified in the application template file corresponding to the selected application are one or more container-orchestration system objects.

4. The system of claim 1, wherein the one or more objects specified in the application template file corresponding to the selected application are created by communicating with a container-orchestration system API server.

5. The system of claim 2, wherein the hostname corresponds to a container-orchestration system service.

6. The system of claim 1, wherein the selected application is a container-orchestration system containerized application.

7. The system of claim 1, wherein each of the available applications to run by the user is a containerized application containing a copy of a virtual repository for the user and data that is specific to both the corresponding application and the user.

8. A method comprising:
    receiving, via a computer network, a request from a client application to view applications available to run by a user of the client application;
    retrieving via the computer network, one or more application template files stored in a repository file system corresponding to the user;
    based on the retrieved one or more application template files, identifying a list of available applications to run by the user;
    receiving, from the client application, a selection of one of the available applications to run by the user;
    identifying an application type for the selected application by parsing the application template file corresponding to the selected application;
    creating a synchronous creation request to a software processor responsible for handling the identified application type, causing the software processor to create one or more objects specified in the application template file corresponding to the selected application; and
    once the created one or more objects are ready, sending application instance information, via the network, to the client application.

9. The method of claim 8, wherein the application instance information includes a hostname and port at which the selected application is available.

10. The method of claim 8, wherein the one or more objects specified in the application template file corresponding to the selected application are one or more container-orchestration system objects.

11. The method of claim 8, wherein the one or more objects specified in the application template file corresponding to the selected application are created by communicating with a container-orchestration system API server.

12. The method of claim 9, wherein the hostname corresponds to a container-orchestration system service.

13. The method of claim 8, wherein the selected application is a container-orchestration system containerized application.

14. The method of claim 8, wherein each of the available applications to run by the user is a containerized application containing a copy of a virtual repository for the user and data that is specific to both the corresponding application and the user.

15. A non-transitory computer-readable medium that stores instructions that, when executed by one or more processors, cause the one or more processors to perform operations comprising:
- receiving, via a computer network, a request from a client application to view applications available to run by a user of the client application;
- retrieving via the computer network, one or more application template files stored in a repository file system corresponding to the user;
- based on the retrieved one or more application template files, identifying a list of available applications to run by the user;
- receiving, from the client application, a selection of one of the available applications to run by the user;
- identifying an application type for the selected application by parsing the application template file corresponding to the selected application;
- creating a synchronous creation request to a software processor responsible for handling the identified application type, causing the software processor to create one or more objects specified in the application template file corresponding to the selected application; and
- once the created one or more objects are ready, sending application instance information, via the network, to the client application.

16. The computer-readable medium of claim 15, wherein the application instance information includes a hostname and port at which the selected application is available.

17. The computer-readable medium of claim 15, wherein the one or more objects specified in the application template file corresponding to the selected application are one or more container-orchestration system objects.

18. The computer-readable medium of claim 15, wherein the one or more objects specified in the application template file corresponding to the selected application are created by communicating with a container-orchestration system API server.

19. The computer-readable medium of claim 16, wherein the hostname corresponds to a container-orchestration system service.

20. The computer-readable medium of claim 15, wherein the selected application is a container-orchestration system containerized application.

* * * * *